(12) United States Patent
Edwards et al.

(10) Patent No.: US 7,861,118 B2
(45) Date of Patent: Dec. 28, 2010

(54) MACHINE INSTRUCTION LEVEL RACE CONDITION DETECTION

(75) Inventors: Andrew James Edwards, Bellevue, WA (US); James Jordan Tigani, Seattle, WA (US); Zhenghao Wang, Redmond, WA (US); Bradley Calder, Bellevue, WA (US); Satish Narayanasamy, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 11/694,864

(22) Filed: Mar. 30, 2007

(65) Prior Publication Data

US 2008/0244332 A1  Oct. 2, 2008

(51) Int. Cl.
*G06F 11/00* (2006.01)
*G06F 11/34* (2006.01)

(52) U.S. Cl. .................. 714/38; 717/124; 717/127; 717/128

(58) Field of Classification Search .................. 714/38; 717/127, 124, 128
See application file for complete search history.

(56) References Cited

U.S. PATENT DOCUMENTS

| | | | |
|---|---|---|---|
| 6,343,371 B1 | 1/2002 | Flanagan et al. | |
| 6,405,326 B1* | 6/2002 | Azagury et al. | ............... 714/38 |
| 6,593,940 B1* | 7/2003 | Petersen et al. | ............. 715/700 |
| 6,851,075 B2 | 2/2005 | Ur et al. | |
| 6,920,634 B1 | 7/2005 | Tudor | |
| 7,028,119 B2 | 4/2006 | Hue | |
| 7,076,776 B2 | 7/2006 | Kim et al. | |
| 7,174,554 B2 | 2/2007 | Pierce et al. | |
| 7,346,813 B1* | 3/2008 | Schulz et al. | ................. 714/48 |
| 7,366,956 B2* | 4/2008 | Karp et al. | ..................... 714/38 |
| 7,752,605 B2* | 7/2010 | Qadeer et al. | ............... 717/127 |
| 2003/0131283 A1* | 7/2003 | Ur et al. | ..................... 714/36 |
| 2005/0038806 A1* | 2/2005 | Ma | ........................... 707/102 |
| 2005/0216798 A1 | 9/2005 | Yu | |
| 2005/0283781 A1 | 12/2005 | Karp et al. | |
| 2007/0011671 A1 | 1/2007 | Kahlon et al. | |
| 2007/0067762 A1* | 3/2007 | Wadsworth et al. | ......... 717/149 |
| 2008/0120627 A1* | 5/2008 | Krauss | ....................... 719/328 |
| 2008/0178156 A1* | 7/2008 | Kahlon et al. | ............... 717/126 |

OTHER PUBLICATIONS

Eraser: A Dynamic Data Race Detector for Multithreaded Programs by Stefan Savage Published Nov. 1997.*
J.D. Choi et al. "Efficient and Precise Datarace Detection for Multithreaded Object-Oriented Programs", ACM SIGPLAN 2002 Conference on Programming Language Design and Implementation (PLDI), Berlin, Germany, Jun. 17-19, 2002.
Michiel Ronsse et al. "RecPlay: A Fully Integrated Practical Record/Replay System", ACM Transactions on Computer Systems (TOCS), May 1999, vol. 17, Issue 2.
Yuan Yu et al. "RaceTrack: Efficient Detection of Data Race Conditions via Adaptive Tracking", ACM Symposium on Operating Systems Principles, Proceedings of the twentieth ACM symposium on Operating systems principles, 2005.

* cited by examiner

*Primary Examiner*—Scott T Baderman
*Assistant Examiner*—Joseph Schell

(57) ABSTRACT

An apparatus, method and computer-readable medium provide for detecting and filtering potential race conditions. In one example, potential race conditions may be detected by determining overlap of memory accesses (e.g., read, write). Potential race conditions may be filtered as potentially benign or harmful race conditions using, for example, heuristics, comparison of output states from execution of instructions or operations in differing sequences or identifying of associated output bugs corresponding to the execution of operations in different sequences.

17 Claims, 16 Drawing Sheets

Thread A: 101>103

Sequence a

...
mov eax, [global]
inc eax
mov [global], eax
...

Thread B: 102>104

Sequence b

...
mov eax, [global]
inc eax
mov [global], eax
...

FIG. 8

MACHINE INSTRUCTION LEVEL RACE CONDITION DETECTION

BACKGROUND

Automatic and accurate detection of race conditions have been problematic. Many potential race conditions may be identified, however, many of the identified potential race conditions may not occur or may not, in fact, result in an adverse outcome. Typically, race conditions are reported that include a large number of either false positives, conditions that do not actually occur, or conditions that do not cause problems in the system. Such over-reporting of race conditions results in confusion and unnecessary increase in data analysis.

Thus, a system or method is needed in which race conditions in a system may be identified accurately such that race conditions that do not cause an adverse output may be filtered from the group of identified race conditions. In addition, a system or method is needed in which harmful race conditions may be efficiently identified.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, instructions may be executed and recorded. Potential race conditions may be identified upon execution of the recorded instructions. The potential race conditions may be filtered and a report containing the identified and filtered race conditions may be generated.

For example, benign race conditions (i.e., race conditions that do not cause an adverse outcome) may be identified and may be filtered or removed from the group of reported race conditions. Also, harmful race conditions may also be identified in the group of race conditions. In another example, the identified harmful race conditions may be identified or prioritized in a data race report.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 8 illustrates the overlapping instruction threads and corresponding counter values.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
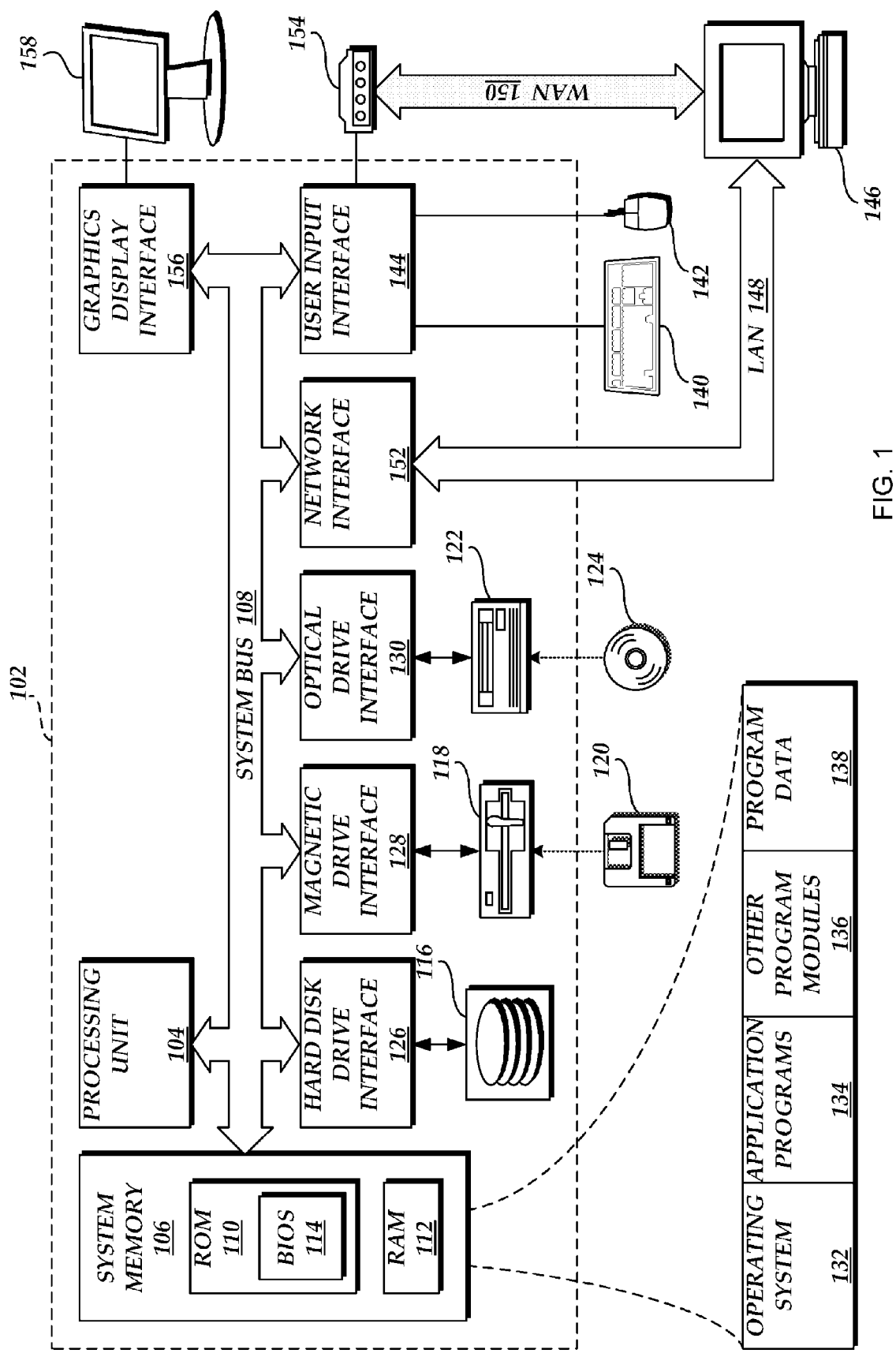
FIG. 1 illustrates an example of a suitable computing system environment for detecting and filtering race conditions.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Instructions may further include any machine executable or software interpretable instruction. Examples of software interpretable instructions include MSIL bytecode or java bytecode, to name a few. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

A method and system is described for detecting race conditions in program threads. Data races may occur in which two or more execution contexts access the same resource location substantially simultaneously. Data races may further result in a race condition in which an output of an execution of a sequence of instructions may critically depend from the timing of the execution of another operation. The resource location may include, for example, a location within a memory in which a data race includes multiple accesses from different operations to the same memory location. In addition, a resource location may include any other type of shared resource such as, but not limited to a shared folder.

Thus, a race condition may result when an output bug results from a data race. Identified data races may be further categorized, filtered, prioritized or grouped according to characteristics of the data races themselves. For example, the identified data races may be identified and classified as those conditions in which a race condition may be believed to exist. However, of the identified data races, certain data races may result in race conditions while certain other data races may, in fact, not result in race conditions at all. Thus, in this example, the identified data races may further be identified and classified as false positive race conditions and/or true positive race conditions in which a false positive race condition is a condition in which a race condition does not result but is nevertheless identified as a data race and a true positive race condition is a condition identified as a race condition in which a race condition does result.

Figure 11:
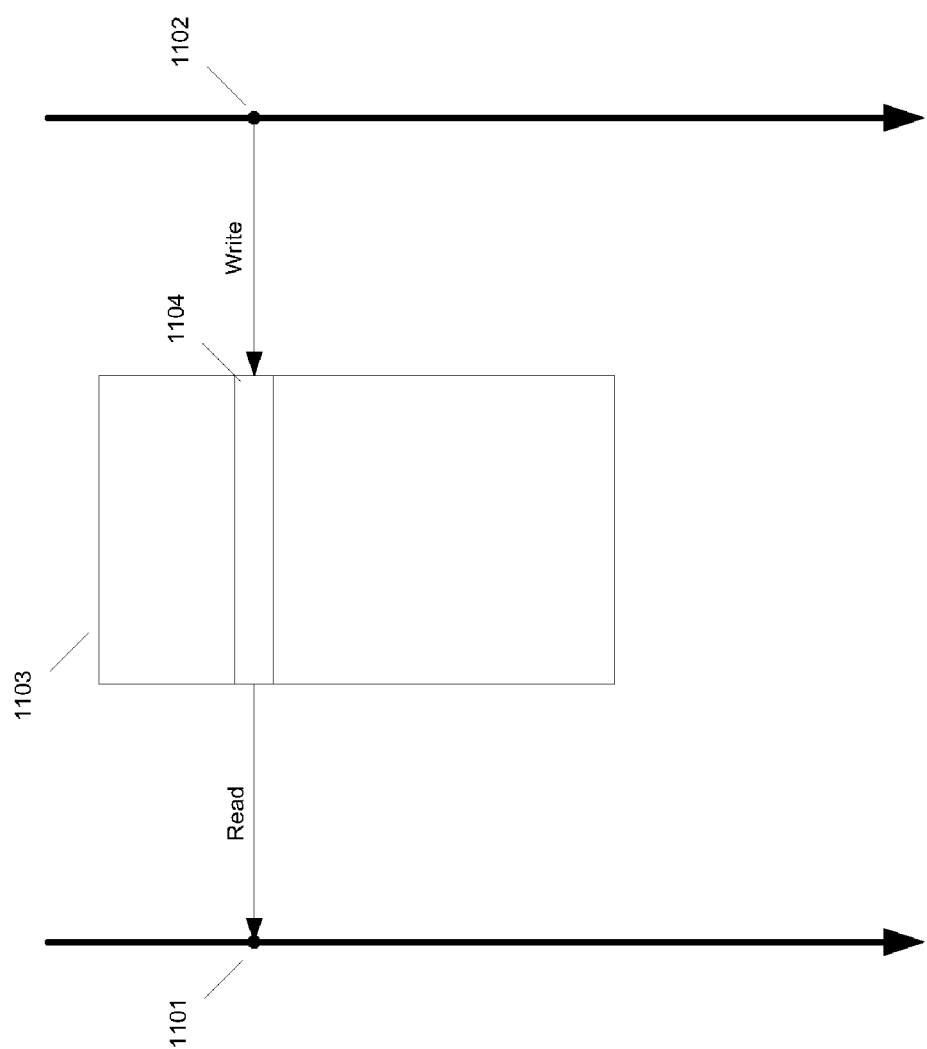
FIG. 11 illustrates one example of race condition detection.

FIG. 11 illustrates one example of race condition detection. In this example, multiple instruction threads are executed. Any of the instruction threads may include any type of execution context. For example, an instruction thread may include a process, fiber or thread running on one or more machines or a multiprocessing environment. Threads may further run simultaneously (e.g., multiprocessing environments) or sequentially (e.g., multi-tasking environment). Detection of race conditions may be accomplished in any scenario. As FIG. 11 illustrates, each instruction thread includes a stream of instructions. These instructions may be executed and/or stored. The stored instructions may further be subsequently analyzed to detect race conditions. If a timing or temporal relationship between instructions on different threads is not known, for example in a situation in which hardware primitives for synchronization is lacking, a read and write to a location in memory may cause a race condition. In the example of FIG. 11, a first instruction thread may contain a read operation 1101 and a second instruction thread may contain a write operation 1102. Also, the read operation 1101 of the first thread may read data from a memory location 1104 in memory 1103 while the write operation 1102 of the second instruction thread may write data to the same memory location 1104 in memory 1103. In the absence of synchronization primitives on the instruction threads, a race condition may result as either of the operations may occur before (or after) the other.

In this example, the operation 1101 of the first thread and the operation 1102 of the second thread are not both read operations. If both of the operations (1101, 1102) are read operations, then a race condition may not occur. Such a condition may be filtered from the pool of race conditions. In one example, a hardware lock may be used. Hardware locks may include any locking primitive to synchronize accesses across multiple execution contexts. Some non-limiting examples of hardware locks include a hardware lock instruction, a memory fence, monitor acquisition or release, or any direct communication outside of a thread of execution including, for example, a system call, a socket send, etc. If a hardware lock is used such as time stamping of the instruction streams such that one operation occurs in a particular time or temporal relationship with the other (e.g., in a predetermined sequence), then a race condition may also not occur and such a condition may be filtered from the pool of race conditions. For example, if the instruction sequences are time stamped or otherwise ordered and a read operation is performed at the memory location 1104 of memory 1103 and a write operation is also performed at the same memory location 1104 of memory 1103, a race condition may not occur because the write operation does not occur concurrently with the read operation in this example. Also, the sequence of execution of the operations may be predetermined. Thus, this situation may also be filtered from the pool of race conditions.

If no hardware primitives are in effect as in the example of FIG. 11, then the read operation 1101 and write operation 1102 overlap by acting upon the same memory location 1104 within memory 1103. As the read operation 1101 and write operation 1102 may occur substantially simultaneously or either the read operation 1101 or write operation 1102 may be executed prior to the other, an overlap may occur between the execution of the operations and a race condition may occur.

Figure 12:
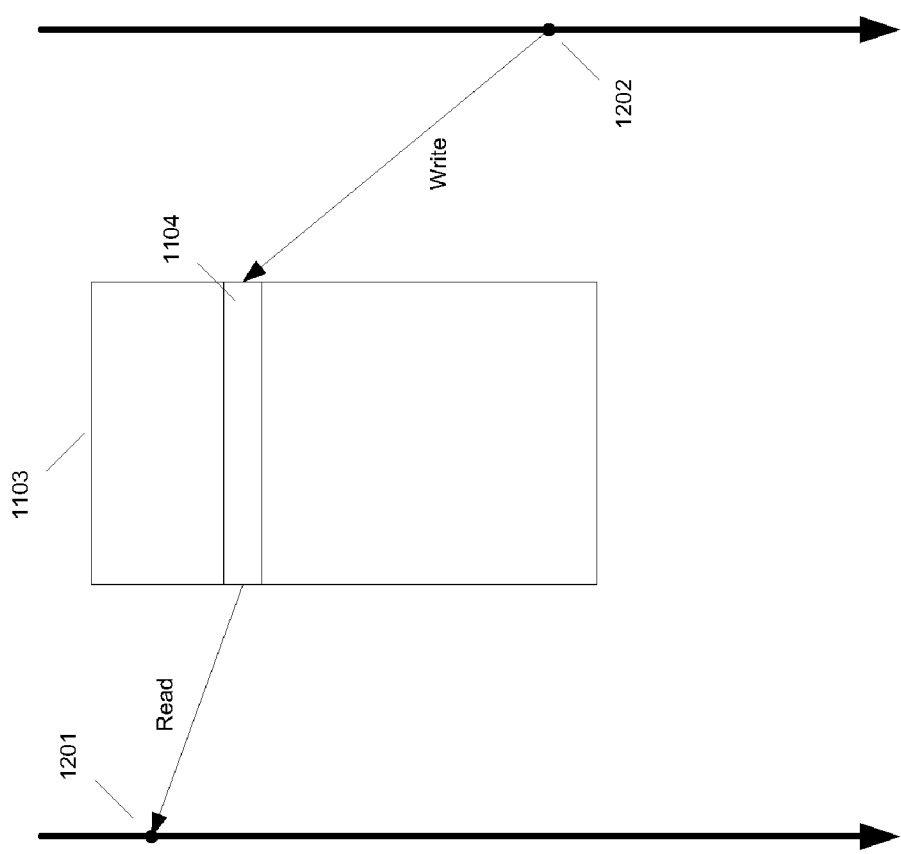
FIG. 12 illustrates an example of non-overlapping operations in multiple instruction threads.

FIG. 12 illustrates an example of non-overlapping operations in multiple instruction threads. In this example, instruction sequences may be sequenced. For example, instructions may be time stamped or may have a counter assigned based on time of occurrence or occurrence relative to execution of other instructions or operations. In this example, a first instruction thread executes a read operation 1201 from a memory location 1104 in memory 1103 at a first instance. A second instruction thread executes a write operation 1202 to the memory location 1104 in memory 1103 after the execution of the read operation 1201 from the first instruction thread. Hence, a race condition does not occur. Such a condition may be filtered from the group of race conditions.

In addition, the false positive race conditions may be identified and filtered from the pool of identified race conditions to result in only true positive race conditions or substantially all true positive race conditions. The resultant group of substantially all true positive race conditions may further be identified and categorized as benign race conditions and harmful race conditions. Benign race conditions are conditions that are identified as race conditions and are, in fact, race conditions (i.e., true positive race conditions) but nevertheless do not produce an adverse or harmful result. Harmful race conditions are conditions that are also identified as true positive race conditions and also produce a result that is harmful to the system. There are many examples of potential harm that may be caused to a system by a harmful race condition. Non-limiting examples of potential harm that may result from a harmful race condition include memory leaks, buffer overrun, etc.

The method and system described herein may identify true positive race conditions from any collection of race conditions and may further identify at least two subsets of true positive race conditions, i.e., benign race conditions and harmful race conditions. In addition, the identified race conditions (e.g., false positive race conditions, benign true positive race conditions, and/or harmful true positive race conditions) may be assigned a priority and may further be provided to a user with a corresponding priority. Alternatively or additionally, results of any of the corresponding identified race conditions may be stored or may be output or displayed to a user. Also, any of the results may be filtered from the group of potential race conditions. In addition, if desired, filtered results may not be reported or output.

Figure 2:
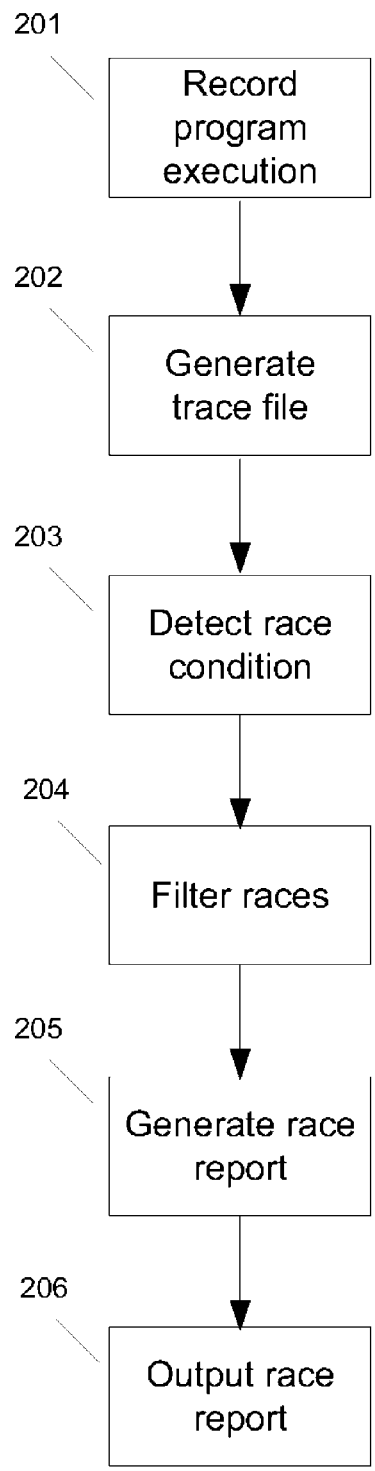
FIG. 2 is a flowchart illustrating one example of identifying race conditions.

FIG. 2 is a flowchart illustrating one example of identifying race conditions. In STEP 201, program execution is recorded. The execution of the program may be recorded in a log and may be replayed offline for race detection. In STEP 202, a trace file is generated and recorded based on the execution of the program. Race conditions may be detected based on replaying of the program execution (STEP 203).

The detected race conditions may include true positive race conditions and false positive race conditions. The false positive race conditions and true positive race conditions may further be differentiated and false positive race conditions may be further filtered from the results (STEP 204). For example, certain race conditions may be identified as race conditions that may not occur. These are one example of a false positive race condition and may be filtered from the results to obtain true positive race conditions. In addition, true positive race conditions identified in this example may include any number of benign race conditions and/or harmful race conditions. Further filtering of the race conditions (STEP 204) may be performed to identify true positive race conditions that are harmful race conditions as well as true positive race conditions that are benign race conditions. In one example, the benign race conditions are identified and filtered or removed from the results. In another example, the benign race conditions and the harmful race conditions are identified and prioritized. For example, a race report may be generated (STEP 205) including identified race conditions in order of relevance or importance. For example, the race report may include a first group of harmful race conditions identified as race conditions that are likely to cause harm, a second group of benign race conditions that are identified as race conditions that are not likely to cause harm, and a third group of false positive race conditions that are not actually race conditions. Alternatively, any of the identified race conditions or groups of race conditions may be filtered and eliminated from the race report. For example, the false positive race conditions and/or the benign race conditions may be filtered from the race report.

The race report may further include an analysis of results from the execution of operations in alternate sequences. Hence, the race report may further contain outcomes such as race condition bugs resulting from harmful race conditions. The race report may be output (STEP 206), for example, to a user.

Figure 3:
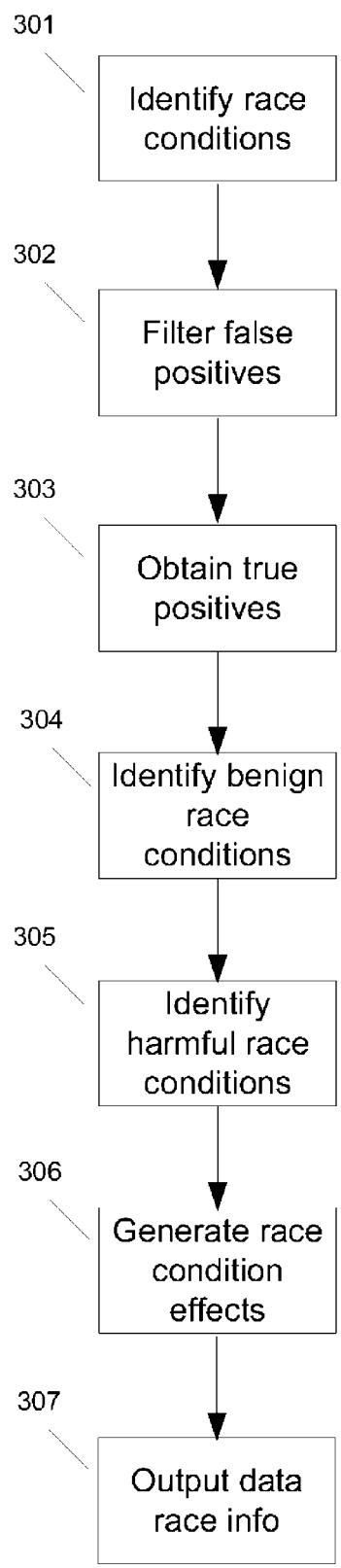
FIG. 3 is a flowchart illustrating an example of identifying and classifying race conditions.
Figure 4:
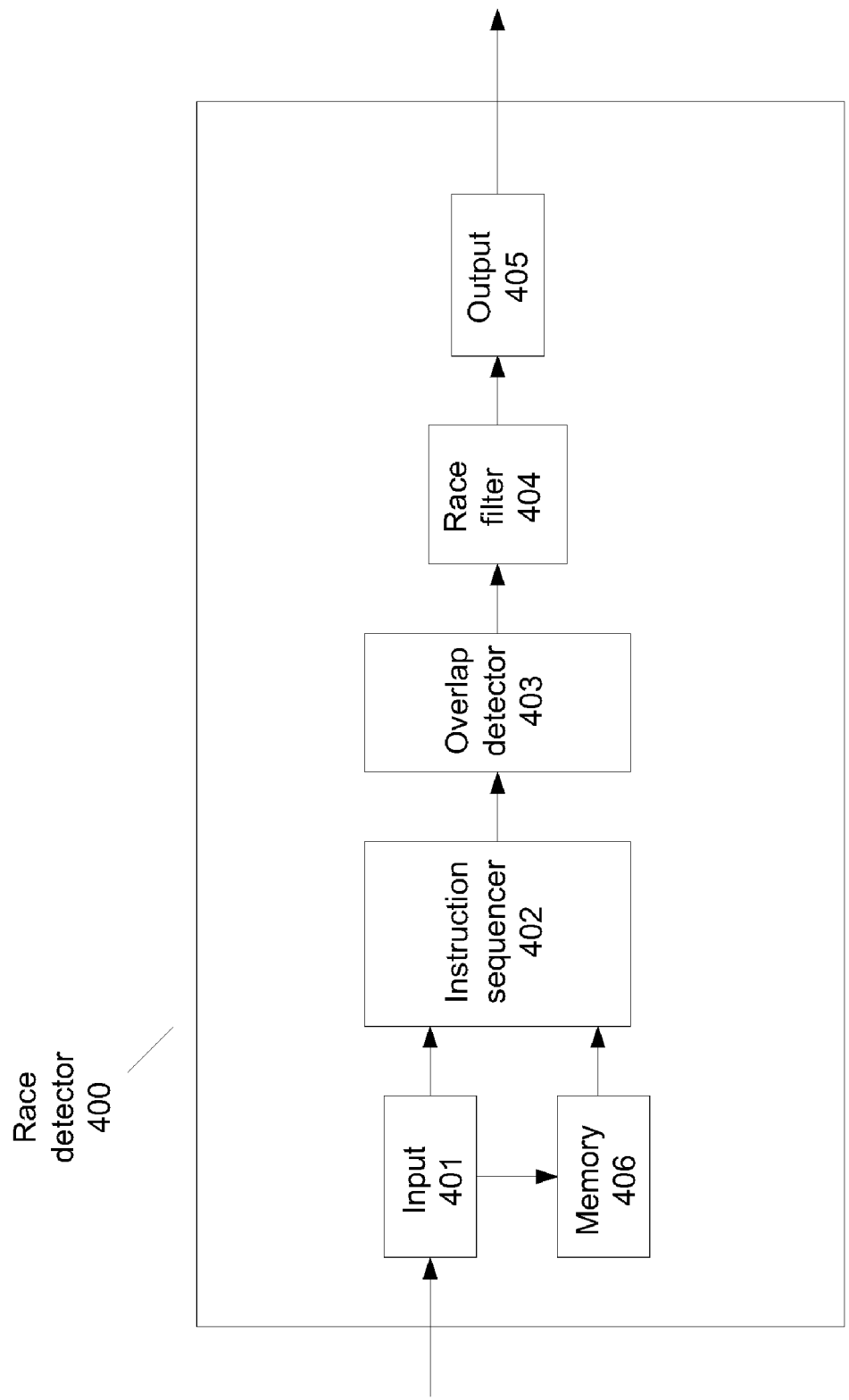
FIG. 4 illustrates an example of a race detector module for identifying and filtering race conditions.

FIG. 3 is a flowchart illustrating an example of identifying and classifying race conditions. FIG. 4 illustrates an example of a race detector module 400 for identifying and filtering race conditions. In STEP 301, race conditions are identified. Identification of race conditions may further include filtering of false positive race conditions (STEP 302). Filtering of false positive race conditions (STEP 302) may provide true positive race conditions. True race conditions may include benign race conditions and/or harmful race conditions.

Figure 5:
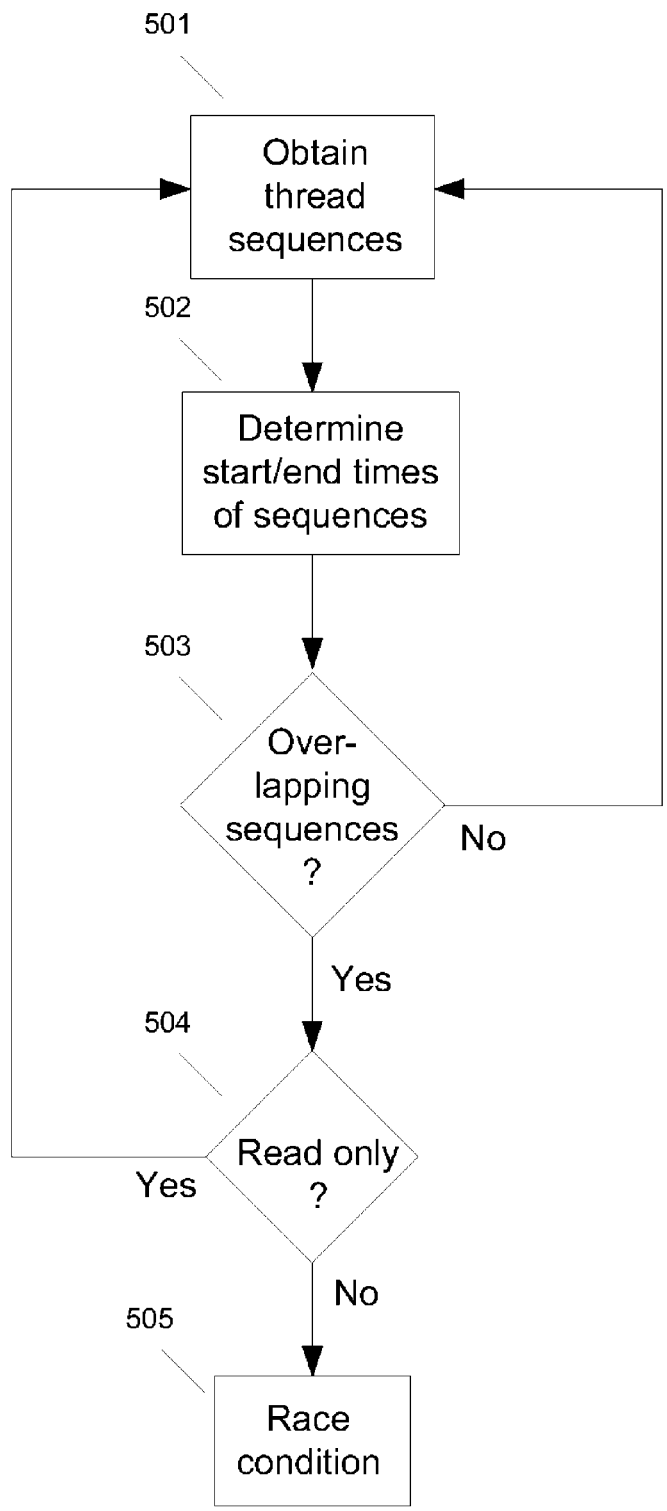
FIG. 5 is a flowchart illustrating one example of filtering of false positive race conditions from a group of identified race conditions.

Filtering of false positive race conditions may be accomplished in a number of ways. FIG. 5 is a flowchart illustrating one example of filtering of false positive race conditions from a group of identified race conditions. In this example, thread sequences of data streams is received (STEP 501). A program is executed and the corresponding instructions such as memory operations may be recorded in a log. The instructions in a thread may have no hardware synchronization primitives or kernel transitions. Start times and/or end times of each of the executed sequences may be determined (STEP 502). In one example, an instruction sequencer (e.g., instruction sequencer 402, FIG. 4) may receive the instruction threads and may assign a counter value to the instructions. The counter value may correspond to an ordering of the sequence of instructions and/or timing of the instructions.

Figure 6:
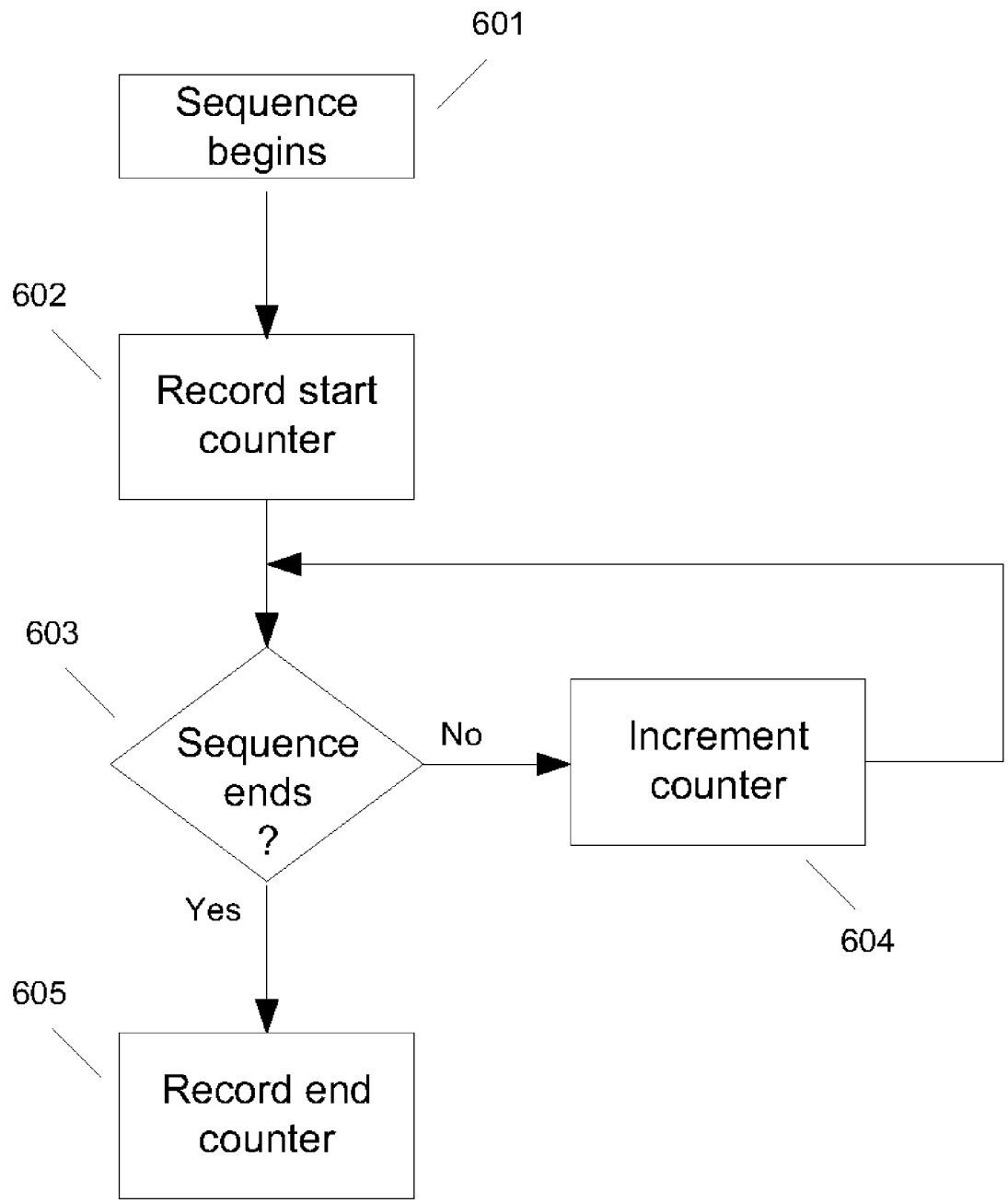
FIG. 6 is a flowchart illustrating one example of sequencing of an instruction stream.

FIG. 6 is a flowchart illustrating one example of sequencing of an instruction stream. When a sequence begins (STEP 601), a time or counter corresponding to the time corresponding to the beginning of the sequence may be recorded at the instruction sequencer 402 (STEP 602). Similarly, when the sequence ends ("Yes" branch of STEP 603), the time and/or counter corresponding to the end of the sequence may be recorded (e.g., at the instruction sequencer 402) (STEP 605). As the sequence of instructions is executed, a counter corresponding to the sequence of instructions may be incremented (STEP 604) until the end of the sequence. The start and end times may be associated with counters that may be stored in an index structure. For multiple instruction threads, corresponding start and end times for each instruction thread may have corresponding counter values stored in the index structure. Thus, the counter in this example is a global counter such that incrementing the counter may be applied to each instruction thread atomically. Comparing the counters of multiple instruction threads may indicate overlapping instruction threads ("Yes" branch of STEP 503). In one example, an overlap detector 403 (FIG. 4) may detect an overlap between different instruction threads.

Figure 7:
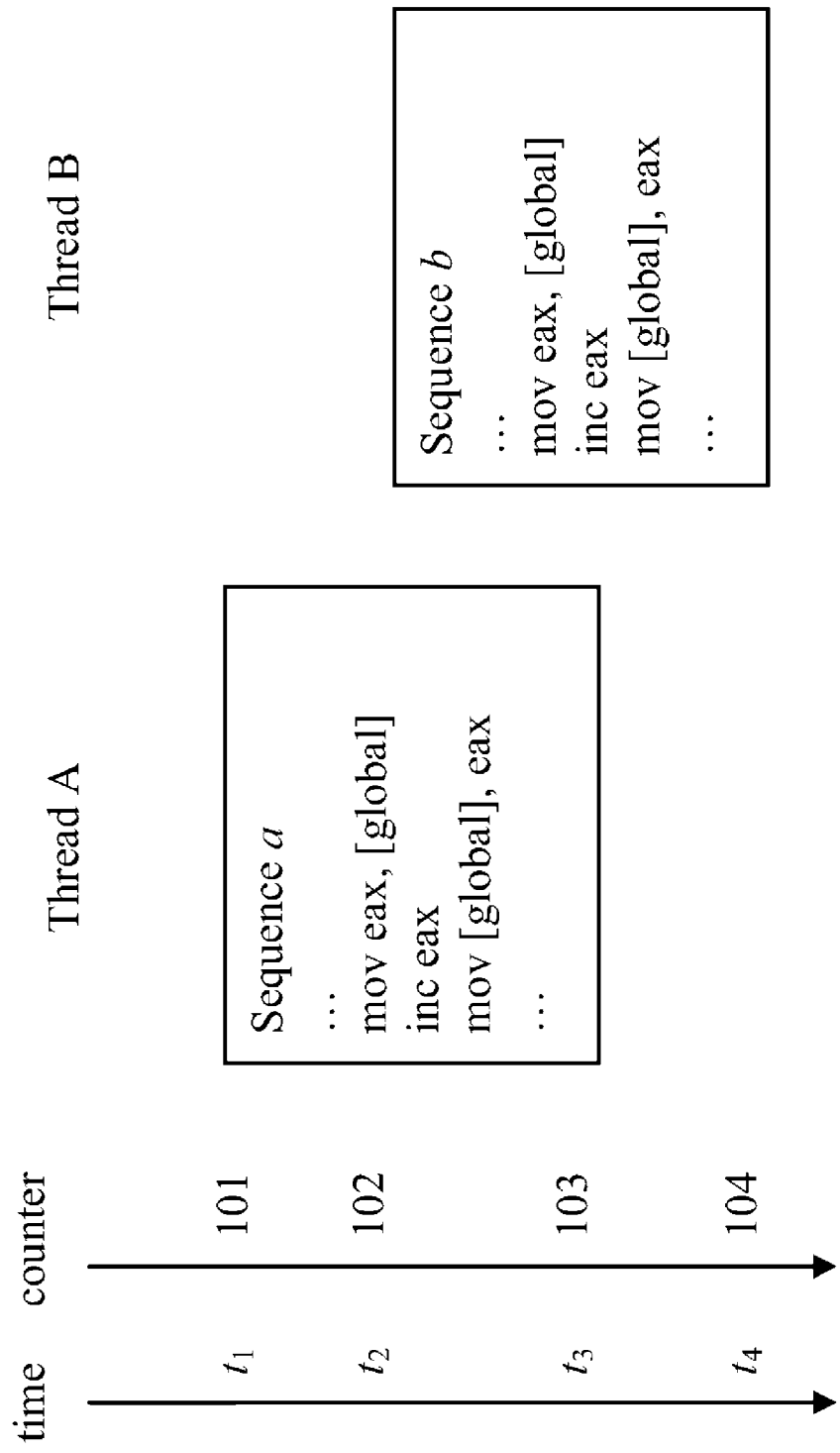
FIG. 7 illustrates one example of overlapping instruction threads.

FIG. 7 illustrates one example of overlapping instruction threads (i.e., Thread A and Thread B). In this example, thread A has a start time at t1 which corresponds to counter 101 and an end time of t3 corresponding to counter 103. Thread B has a start time of t2 corresponding to counter 102 and an end time of t4 corresponding to counter 104. FIG. 8 illustrates the overlapping instruction threads and corresponding counter values. In this example, thread A has a sequence of instructions from counter 101-103 and thread B has a sequence of instructions from counter 102-104. An overlap may be detected between thread A and thread B (i.e., counters 102-103). Although FIG. 7 illustrates two instruction threads, any number of instruction threads may be used.

In one example, multiple overlapping instruction threads may be detected ("Yes" branch of STEP 503). For example, an overlap detector 403 (FIG. 4) may detect that two or more instruction threads share at least one common counter associated with a time of execution. Each of the overlapping instructions in the multiple overlapping instruction threads may be compared. An instruction on a first instruction thread may access a memory location and an instruction on a second instruction thread may also access the memory location. In this example, the instruction on the first instruction thread is a "read" from memory and the instruction on the second instruction thread is also a "read" from memory ("Yes" branch of STEP 504). Because each overlapping instruction is a read in this example and neither overlapping instruction is a "write" from the memory location, the condition may be filtered by a race filter 404 as being a benign race condition. Otherwise, if at least one of the overlapping instructions in any of the overlapping instruction threads is a "write" from memory ("No" branch of STEP 504), a potential race condition may be identified (STEP 505).

True positive race conditions may be obtained (STEP 303, FIG. 3) from filtering of false positive race conditions from identified race conditions (STEP 302). The true positive race conditions may include potentially benign race conditions and/or potentially harmful race conditions. In one example, potentially benign race conditions (STEP 304) and potentially harmful race conditions (STEP 305) are identified within a group of true positive race conditions. Also, any of the true positive race conditions may be prioritized or ranked according to importance or relevance. The importance or relevance may be based, for example, on effects resulting from execution of race conditions. For example, instruction threads may be executed or replayed and may be evaluated for true positive race conditions. Also, resulting effects from execution of the true positive race conditions may be observed. The effects may be stored in a list, report, or table (STEP 306) and/or output to a user (STEP 307).

In one example, potentially harmful race conditions may be identified as well as effects caused by the identified potentially harmful race conditions. If a potentially harmful race condition is identified as producing a harmful result, the harmful result may be further evaluated for relevance or severity. Based on the evaluation of the harmful result, the corresponding harmful race condition may be assigned a corresponding priority value. High ranking harmful race conditions may be identified and output, for example, to a user (STEP 307). For example, output 405 (FIG. 4) may be included in a race detector 400 for outputting race conditions (e.g., filtered true positive race conditions) and/or priority or ranking information for the race conditions.

Figure 9:
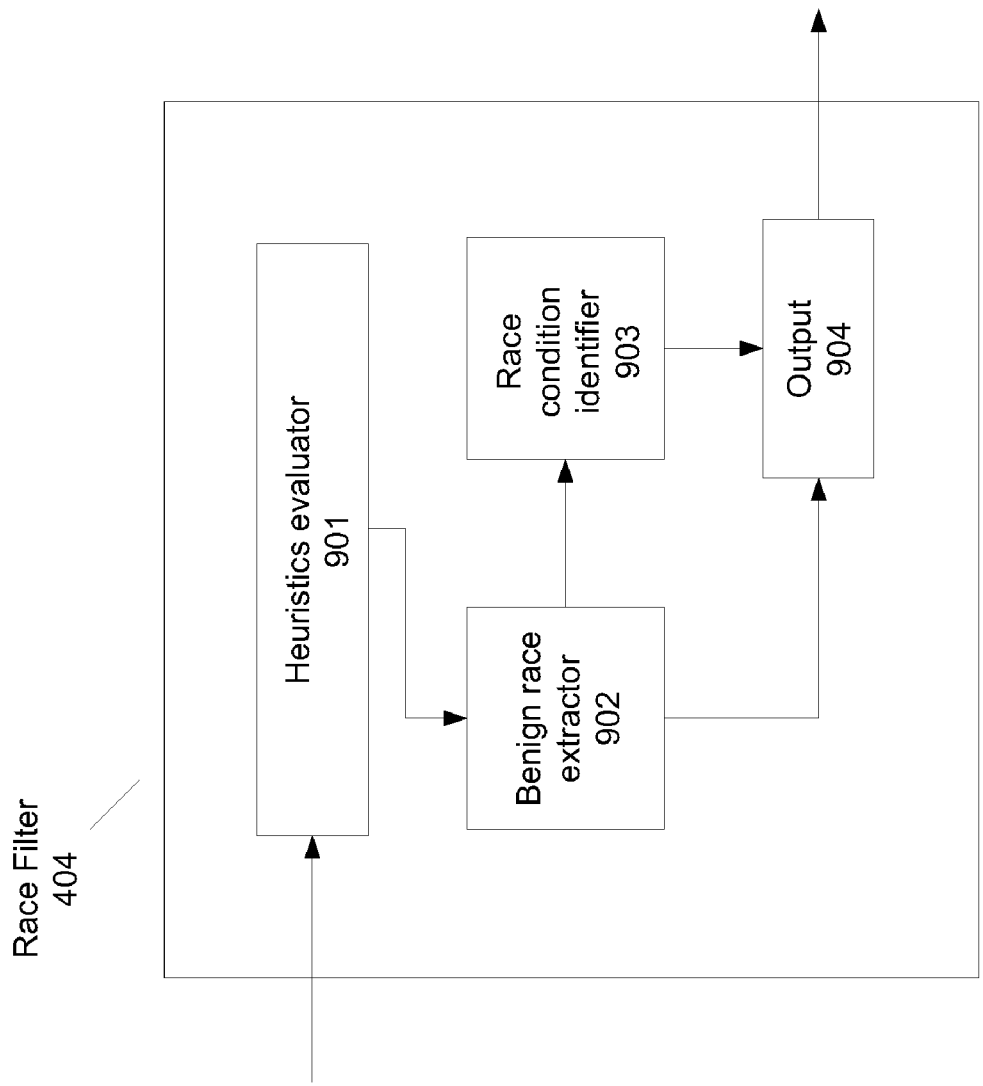
FIG. 9 illustrates an example of a race filter.

FIG. 9 illustrates an example of a race filter. The race filter 404 illustrated in FIG. 9 is merely one example of a module for identifying race conditions or filtering race conditions. Any additional components may be included in the race filter 404 or any of the components may be re-configured, modified, or even skipped. The race filter may identify and/or filter certain conditions based on potential for forming a race condition. For example, the race filter 404 may receive a group of potential race conditions at a heuristics evaluator 901. The heuristics evaluator 901 may apply heuristics to the group of potential race conditions to determine a subset of the group of potential race conditions. The subset of potential race conditions identified by the heuristics evaluator 901 may include true positive benign race conditions. These benign race conditions may be race conditions that are considered benign in that they may not cause adverse effects.

The heuristics evaluator 901 may apply any number or type of heuristics to identify benign race conditions. For example, the heuristics evaluator 901 may receive a group of true positive race conditions and identify within the group of true positive race conditions a condition in which a read operation on a first instruction overlaps with a read operation on a second instruction thread. Although indicated to be a potential race conditions, the heuristics evaluator 901 may identify the condition as a benign condition as the two overlapping read operations may not result in an actual race condition.

Figure 10:
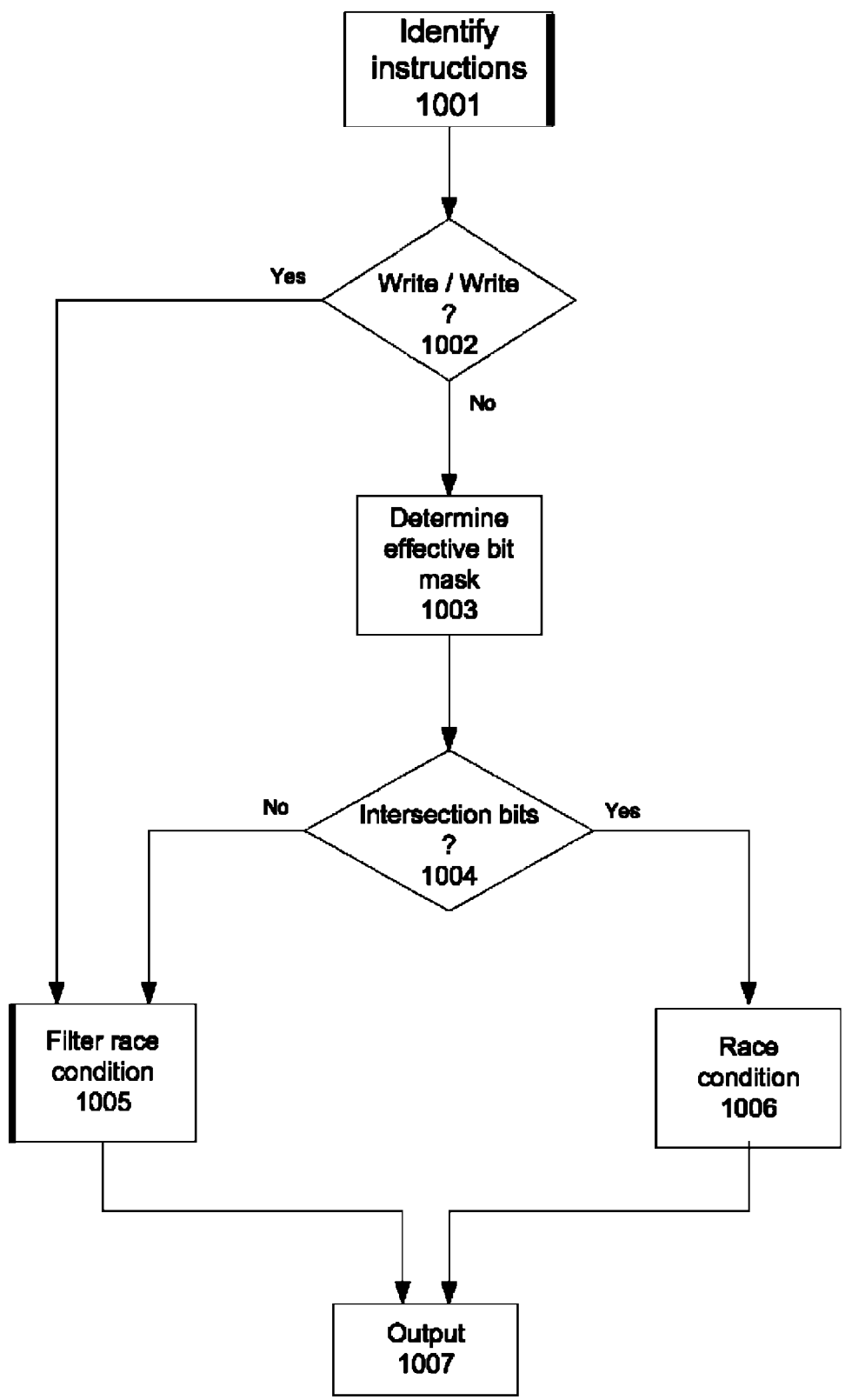
FIG. 10 is a flowchart illustrating other examples of heuristics applied to potential race conditions.

FIG. 10 is a flowchart illustrating other examples of heuristics applied to potential race conditions. In this example, an instruction thread may be received at the heuristics evaluator 901. The heuristics evaluator 901 may identify the instructions (STEP 1001) and determine each of the operations in each instruction thread as well as temporal or timing relationships between the instructions. For example, the heuristics evaluator 901 may identify a condition in which an operation on a first instruction thread writes data to a memory location while an operation on a second instruction thread that overlaps temporally with the operation on the first instruction thread also writes data to the same memory location. However, in this example, the heuristics evaluator 901 may identify the data written in both operations (i.e., the operation of the first instruction thread and the operation of the second instruction thread) (STEP 1002). If the data written in both operations are the same ("Yes" branch of STEP 1002), then the condition may be identified as a benign race condition. The identified write/write condition may be filtered (STEP 1005).

In another example of heuristics, a write operation may write a value to a memory location. The heuristics evaluator 901 may determine a value at the memory location and a value of the data written to the memory location. In this example, the heuristics evaluator 901 may determine that the previous value at the memory location is the same as the value written to the memory location. In this case, the heuristics evaluator 901 may identify a benign race condition. The benign race condition may further be filtered from the group of race conditions.

Also, the heuristics evaluator 901 may determine an effective bit mask (STEP 1003). The effective bitmask may be used to filter out races that are on different bits. In one example, in a read operation, information including a first bit may be read from memory location. Also, a write operation may write to a second bit at the memory location. The first bit read in the read operation may be used in a subsequent operation while the second bit written by the write operation may not be used in a subsequent operation. The heuristics evaluator 901 may determine the effective bits that are read or written to identify and/or filter race conditions that are on different bits. When a read operation and an overlapping write operation modify, access, or subsequently use different bits at a memory location, the bit masks are non-intersecting ("No" branch of STEP 1004) and the condition may be identified as a benign race condition. This condition may further be filtered from the group of potential race conditions (STEP 1005). In one example, bits that are read in the read operation may be tagged. The tagged bits are flowed to determine if the bits are subsequently used. If the bits that are modified by the write operation are determined to be read in the read operation and not subsequently used, then a benign race condition may exist in which an adverse outcome does not occur.

Alternatively, the bit masks may be intersecting ("Yes" branch of STEP 1004) such that overlapping read and write operations of different instruction threads may modify or access and subsequently use common bits at a memory location. For example, the process may tag and flow the bits read in the read operation to determine that the bits are subsequently used. These bits may also be written into by the write operation. In this case, the condition associated with the intersecting bit masks may be identified as a potential harmful race condition (STEP 1006).

Thus, in this example, based on heuristics filtering of potential race conditions, benign race conditions may be removed from the race conditions to provide potentially harmful race conditions. The identified potentially harmful race conditions may be output (STEP 1007) to a user.

Figure 13:
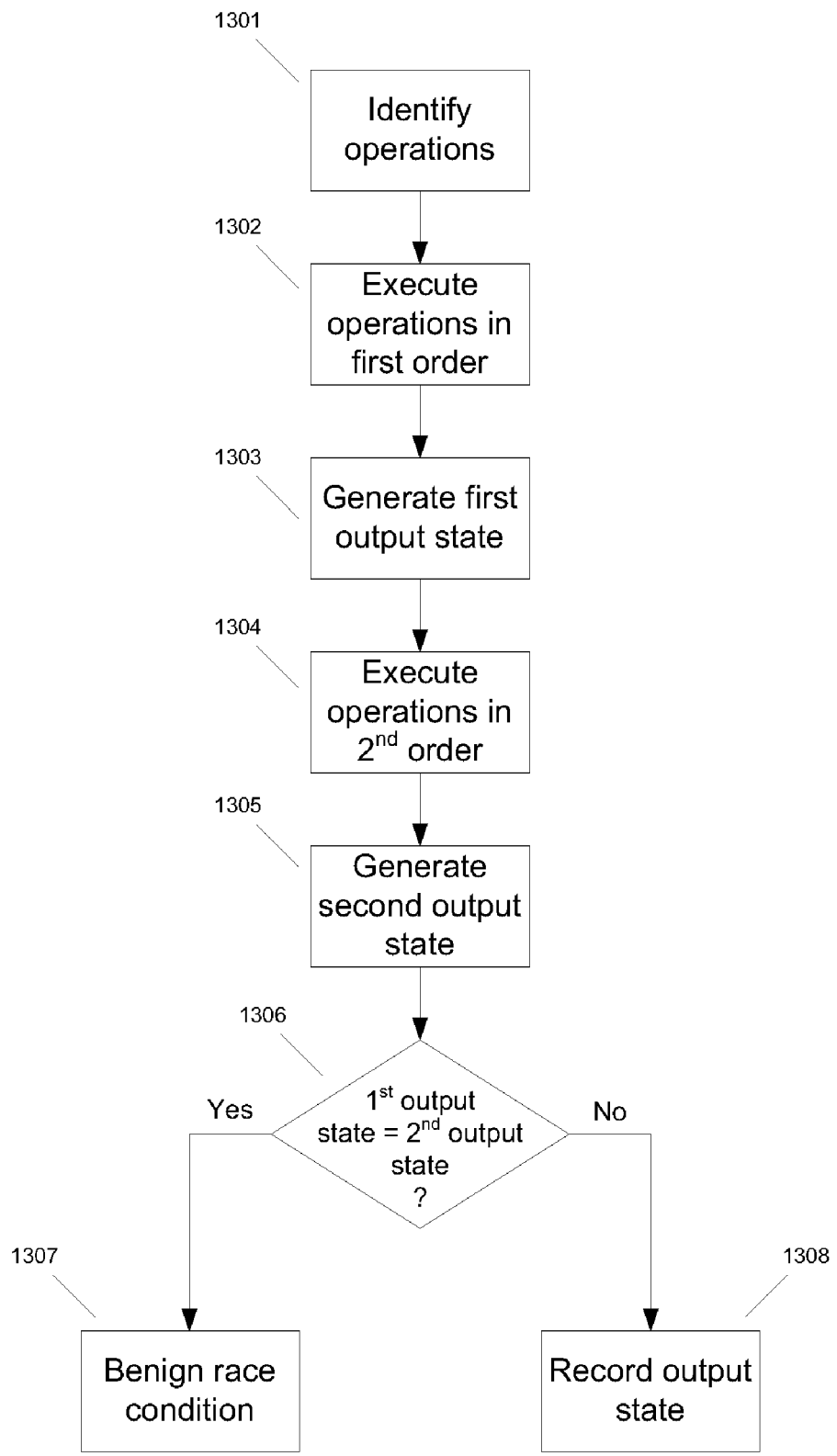
FIG. 13 is a flowchart illustrating an example of identifying benign race conditions.

In another example, benign race conditions may be identified in and/or filtered from a group of potential race conditions via, for example, a benign race condition extractor 902 (FIG. 9). In this example, instruction threads may be executed and may be provided to a race filter 404. The executed instruction threads may further be recorded and replayed offline for analysis of race conditions. FIG. 13 is a flowchart illustrating an example of identifying benign race conditions in a group of potential race conditions.

Figures 14A, 14B:
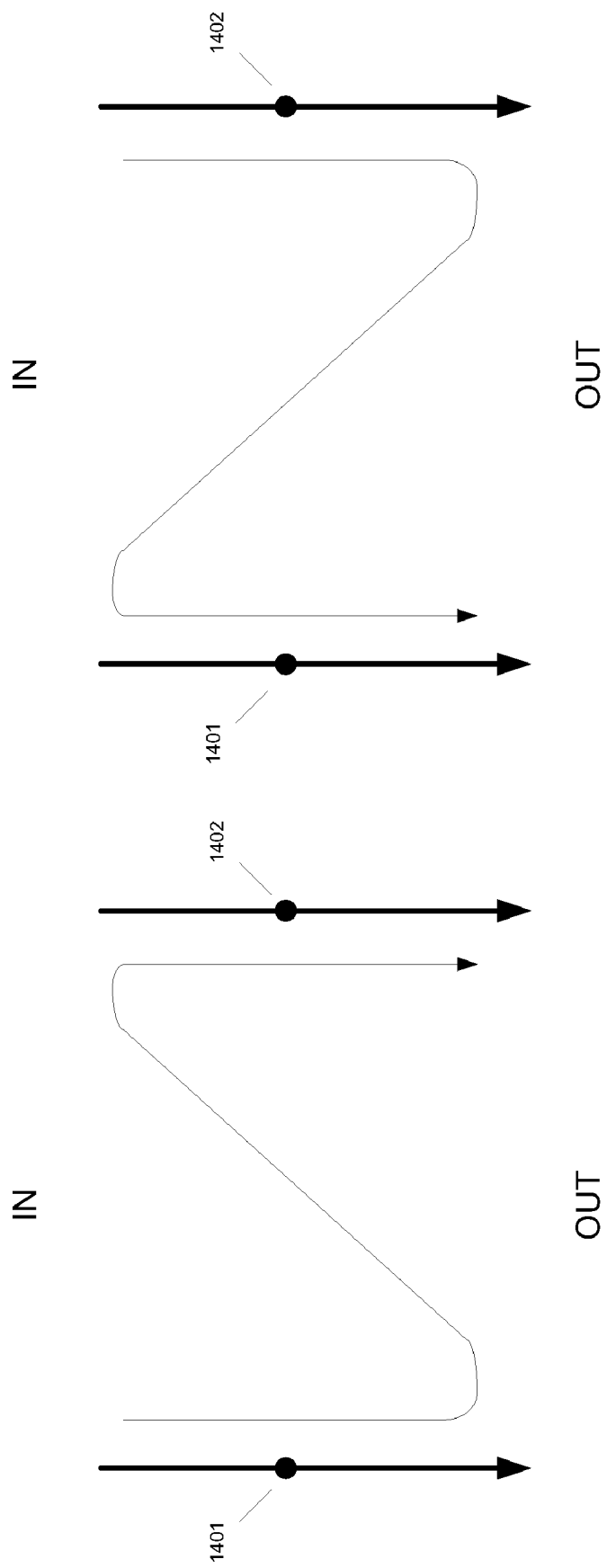
FIG. 14A illustrates an example of executing operations in multiple instruction threads in a first order.
FIG. 14B illustrates an example of executing operations in a second order.

In STEP 1301, operations may be identified in the instruction threads. Execution of the instruction threads may be recorded in a log and be may replayed to determine potential race conditions. The operations in the instruction threads may be executed in a first order and a result may be recorded (STEP 1302). FIG. 14A illustrates an example of executing operations in multiple instruction threads in a first order. Although FIG. 14A illustrates two instructions threads, any number of instructions threads with any number of overlapping instructions may be identified and/or processed.

An operation in a first instruction thread 1401 may be executed in the first thread followed by execution of the second instruction thread which contains the second operation 1402. Therefore, in this example, the first order of execution of the operations is executing operation 1401 followed by executing operation 1402. Prior to execution of the operations or instruction threads, an input state is recorded. The input state may include any state information pertaining to the system prior to execution of the instructions and operations. Following execution of the instruction threads and corresponding operations in the first order or sequence, an output state is generated and/or recorded (STEP 1303).

In STEP 1304, the operations may be executed in a second order. FIG. 14B illustrates an example of executing the operations of FIG. 14A in a second order. The operation 1401 of the first instruction thread is executed after execution of the operation 1402 of the second instruction thread. Prior to the execution of the operations/instruction threads, an input state is recorded. The input state in this example is substantially the same as the input state illustrated in FIG. 14*a*. After execution of the operation of the second instruction thread followed by execution of the operation of the first instruction thread, the output state is generated and/or recorded. This output state may be compared to the output state resulting from the execution of the operations in the first order (i.e., the output state of FIG. 14*a* in this example). If the output state from the first operation sequence is substantially equal to the output state from the second operation sequence ("Yes" branch of STEP 1306), the condition may be identified as a benign race condition (STEP 1307). Alternatively, if the output state from the second first operation sequence is not equal to the output state from the second operation sequence ("No" branch of STEP 1306), the condition may be a harmful race condition. The potential harmful race condition may further be recorded our output to a user (STEP 1308).

In addition, more than two instruction threads may be used with any number of operations. For example, 3, 4, 5, 6, 7, 8, 10, 20, 50, etc. instructions threads may be executed with any number of operations. Resulting output states corresponding to the instruction sequence execution may be measured and compared as described above.

In another example, a race filter 404 may also include a race condition identifier 903 (FIG. 9). The race condition identifier 903 may identify conditions within a group of potential race conditions as being potentially harmful. For example, any number of conditions in which a read operation on an instruction thread overlaps temporally with a write operation on another instruction thread may be identified as potential race conditions. However, a subset of conditions within the group of conditions identified as potential race conditions may be further identified as benign race conditions as described above. Further, a subset of conditions within the group of conditions identified as potential race conditions may also be identified as harmful race conditions. In one example, harmful race conditions include those race conditions that may cause an adverse result to the system such as memory leaks, buffer overrun, system crashes, etc.

Figure 15:
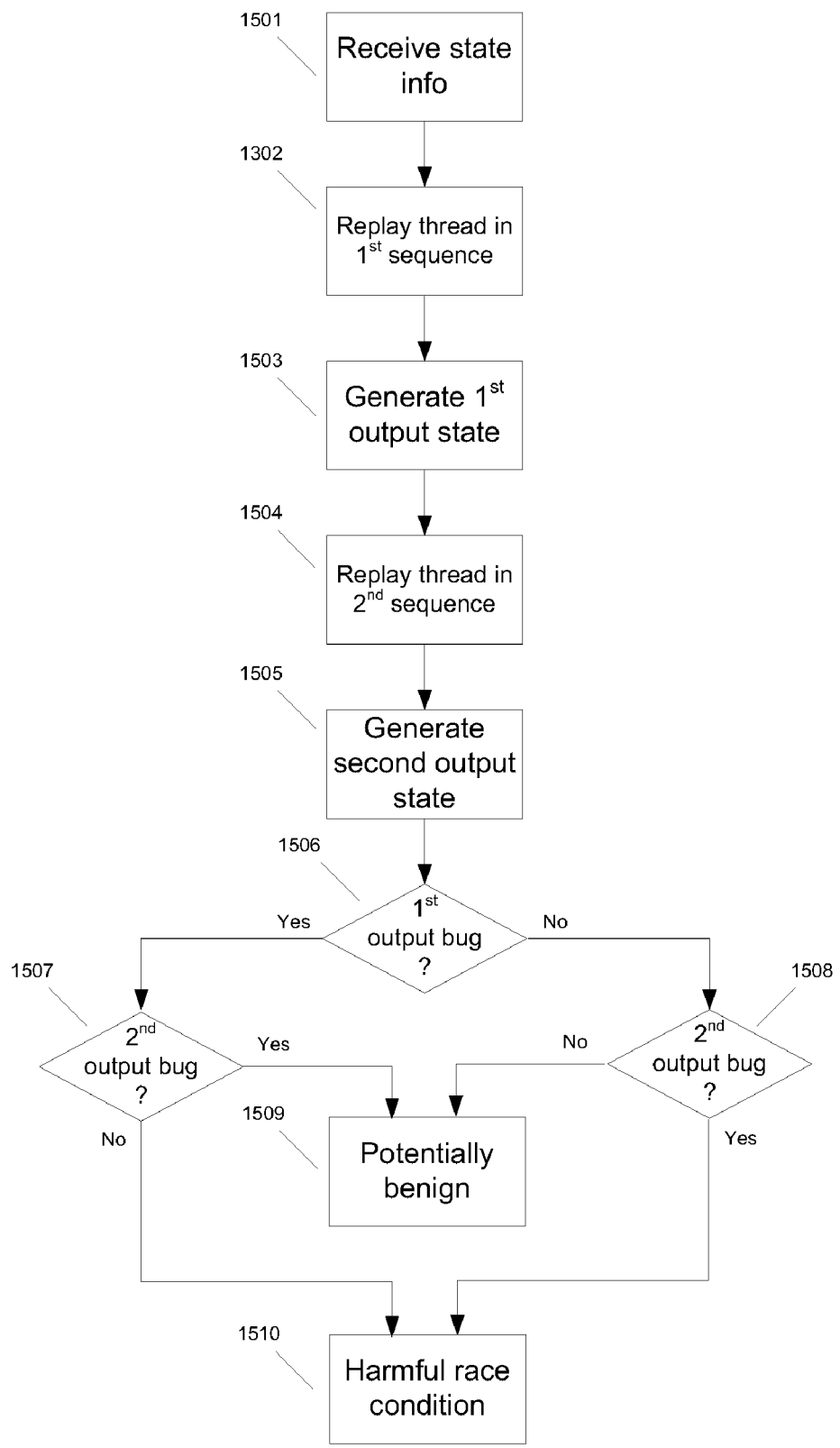
FIG. 15 is a flowchart illustrating one example of identifying a harmful race condition.

FIG. 15 is a flowchart illustrating one example of identifying a harmful race condition. Although the example illustrated in FIG. 15 includes two instruction threads, any number of threads may be evaluated for race conditions such that any number of instruction threads containing temporally overlapping read and/or write operations may be determined to be potential race conditions. In one example, a series of operations on any number of instruction threads may be executed in sequence and recorded. The execution of the instructions and operations may be recorded, for example, in a replay log which may be replayed offline. A first output state may be determined (STEP 1503) after execution of the sequence of operations in a first sequence (STEP 1502). Execution of the operations may be repeated but in a different order (STEP 1504) as described above to obtain a second output state (STEP 1505). The first output state may be compared to the second output state to determine an effect of the order of execution of the operations on the output state. If the first output state and the second output state differ, then the condition may be identified as a potential harmful race condition.

Figure 16:
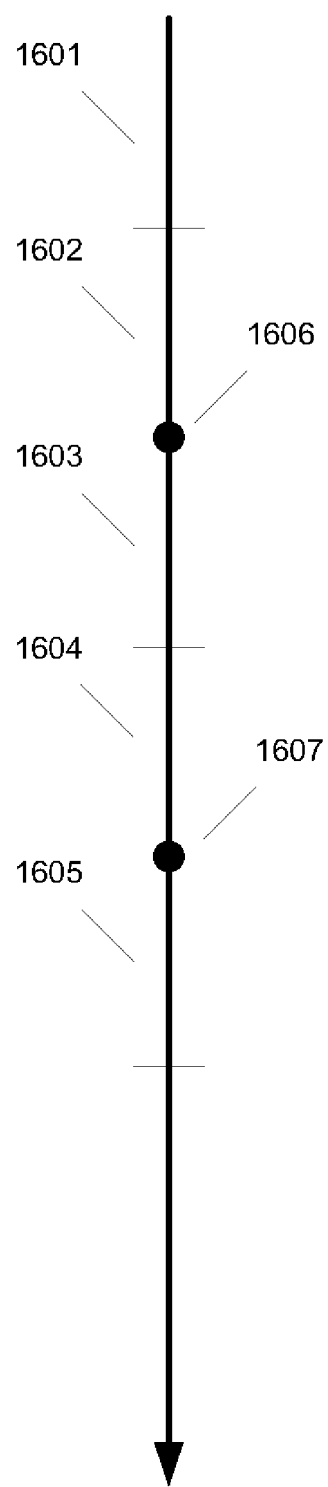
FIG. 16 illustrates an example of detecting a harmful effect of execution of a harmful race condition.

In the example illustrated in FIG. 15, an output bug associated with the execution of the operations in the first sequence and/or an output bug associated with the execution of the operations in the second sequence may be detected. FIG. 16 illustrates an example of detecting an output bug or other harmful effect of execution of a harmful race condition. Such output bugs or harmful effects may include any undesired result from execution of the harmful race condition. Some non-limiting examples of output bugs include memory leaks, buffer overruns, system crashes, AVs, use of uninitialized variable, function contract violation, etc.

In this example, a first output bug may be detected from execution of the operations of the instruction threads in the first sequence ("Yes" branch of STEP 1506). Execution of the operations of the instruction threads in the second sequence may be examined to determine a resulting occurrence of the output bug. If the output bug results when either the operations are executed in the first sequence or the second sequence ("Yes" branch of STEP 1507), the race condition may be identified as a potentially benign race condition. If the output bug results from execution of the operations in the first sequence but does not occur from execution of the operations in the second sequence ("No" branch of STEP 1507), then the condition may be identified as a potentially harmful race condition. This condition may further be included in a list or group of harmful race conditions. In another example, the condition may be output to a user as indicating the condition as potentially harmful. In addition, any number of instruction threads may be included with a corresponding number of sequences.

Similarly, if execution of either the first or the second sequences of operations (or any number of sequences) causes the output bug such as execution of the second sequence but not execution of the first sequence ("No" branch of STEP 1506, "Yes" branch of STEP 1508), then a harmful race condition may be identified (STEP 1510). If neither execution of the first nor the second sequences results in the output bug ("No" branch of STEP 1506 and "No" branch of STEP 1508), then the condition may be identified as potentially benign. In another example, the potentially benign condition may be filtered from the group of race conditions which may be output or reported to a user. Also in this example, output bugs may be identified from scanning of the different instruction sequences and/or comparison of output states resulting from execution of the respective instruction sequences. Thus, potentially harmful race conditions and potentially benign race conditions may be differentiated by scanning replays of instruction sequences for associated output bugs and, alternatively or additionally, comparing respective output states for each of the instruction sequences.

FIG. 16 illustrates an example of execution of a sequence of instructions and determining occurrence of an output bug. In this example, two operations, which may be from different instruction threads, may be executed in a particular sequence. Also, execution of operations 1606 and 1607 may be performed in different sequences. For example, the instruction thread may contain different sequences 1601, 1602, 1603, 1604, and 1605. The sequences may be executed in one order such as execution of sequence 1601 followed by execution of sequence 1602 followed by execution of sequence 1603 followed by execution of sequence 1604 and followed by execution of sequence 1605. In this example, execution of operation 1606 occurs prior to execution of operation 1607. An output state may be determined based on the execution of the operations in the sequence. Also, output bugs may also be determined resulting from the execution of the sequence of operations.

The execution of the instruction sequences may be repeated any number of times. At any of the execution repetitions, any order of execution of sequences may be performed. For example, in a second execution of the instruction sequences, sequence 1601 may be executed first followed by execution of sequence 1604, followed by execution of sequence 1605, followed by execution of sequence 1602, and followed by execution of sequence 1603. Hence, in this example, operation 1607 may be executed prior to execution of operation 1606. The occurrence of the output bug resulting from execution of the operations in the specified order may be determined. If the output bug in this example occurs as a result of execution of the one sequence but does not occur from the execution of another sequence, then the condition may be determined to be a potentially harmful race condition. In another example, the output bug may occur as a result of any of the sequences. In this case, the condition may be identified as a potentially benign race condition. In yet another example, this condition may be filtered from the group of race conditions that may be output to a user.

In another example, an instruction sequence which may include a sequence of instructions from any number of instruction threads may be run such that temporally overlapping instructions on any number of instruction threads may be executed and recorded in a replay log. The replay log may be replayed any number of times and in any number of orders or sequences and evaluated for classification of race conditions. For example, the instructions may be run such that an operation on a first instruction thread is executed prior to an operation on a second instruction thread where the operation on the first instruction thread overlaps in time with the operation on the second instruction thread during the original execution. Additionally, either the operation on the first instruction thread or the instruction on the second instruction thread may be a write to a memory location while the other operation may be a read to the memory location where the bits written to by the write operation overlap with bits that are read by the read operation and where the bits read the read operation are subsequently used. Alternatively or additionally, each of the operations on any of the instructions threads may be a write operation where at least one of the write operations writes a value to the memory location that is different from the value written by another write operation.

An output state may be determined for each of the executions of different sequences of execution of the operations and a difference in the different output states may be identified. Additionally or alternatively, execution of different sequences of the instructions and operations may be performed and an output bug associated with the execution of the sequences of instructions and operations may be identified. An output bug may include any undesired event in the system such as but not limited to memory leaks, buffer overruns, system crashes, AVs, use of uninitialized variable, function contract violation, etc. In this example, if an output bug results from execution of the operations in one sequence but not from execution of the operations in the other sequence, the corresponding condition may be identified as a potentially harmful race condition. Alternatively, if an output bug results from the execution of the operations in each of the sequences or if no output bug is detect from execution of the operations in any of the sequences, the corresponding condition may be identified as a potentially benign race condition.

In another example, potentially harmful race conditions may be stored and/or output to a user to indicate the race condition. Also, if desired, benign race conditions may be filtered and not included in the output to the user. Alternatively, the harmful and benign race conditions may be assigned a corresponding priority value and may be stored and/or output to a user with the corresponding priority values indicating a rank or priority (i.e., level of relevance or importance) of each of the identified race conditions.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. One or more computer-readable media containing executable code for performing the following steps:
   recording execution of a first execution context comprising a first write instruction and a second execution context comprising a second write instruction;
   detecting one or more possible race conditions that may occur when concurrently executing the first execution context and the second execution context;
   filtering one or more false positive race conditions from the one or more possible race conditions to obtain a positive race condition;
   determining that the first write instruction writes a first value to a memory location during the positive race condition, and that the second write instruction writes a second value to the memory location during the positive race condition;
   comparing the first value to the second value;
   categorizing the positive race condition as a potentially harmful race condition when the first value is different from the second value; and
   categorizing the positive race condition as a potentially benign race condition when the first value is equal to the second value.

2. The one or more computer-readable media of claim 1, wherein the first execution context comprises a first instruction thread and the second execution context comprises a second instruction thread.

3. The one or more computer-readable media of claim 2, wherein detecting the one or more possible race conditions comprises:
   determining an execution time overlap between at least a first plurality of instructions associated with the first instruction thread and a second plurality of instructions associated with the second instruction thread; and
   identifying the one or more possible race conditions based on the determination of the execution time overlap.

4. The one or more computer-readable media of claim 3, wherein determining the execution time overlap includes:
   recording a start time and an end time for at least the first instruction thread and the second instruction thread;
   identifying an overlap between the start time and the end time of at least the first instruction thread and the start time and the end time of the second instruction thread; and identifying the execution time overlap between at least the first instruction thread and the second instruction thread based on the identified overlap.

5. The one or more computer-readable media of claim 1, further comprising executable code for:
assigning a first priority value to the positive race condition when the positive race condition is categorized as a potentially harmful race condition; and
assigning a second priority value to the positive race condition when the positive race condition is categorized as a potentially benign race condition.

6. The one or more computer-readable media of claim 5, further comprising executable code for:
generating a race condition report based on the filtering, wherein the race condition report includes the positive race condition and the one or more false positive race conditions.

7. The one or more computer-readable media according to claim 1, wherein the first execution context and the second execution context each include a plurality of instructions that are executed sequentially in a multi-tasking environment.

8. The one or more computer-readable media according to claim 1, wherein the first execution context and the second execution context run simultaneously in a multiprocessing environment.

9. One or more computer-readable media containing executable code for performing the following steps:
detecting a plurality of race conditions that may occur when concurrently executing a first instruction thread and a second instruction thread, the first instruction thread comprising a write instruction that writes a value to a memory location;
filtering the plurality of race conditions, wherein filtering the plurality of race conditions comprises, for a first one of the race conditions:
determining a value stored at the memory location prior to executing the write instruction of the first instruction thread;
executing at least a portion of the first instruction thread, including the write instruction;
comparing the value stored at the memory location prior to executing the write instruction to the value written by the write instruction of the first instruction thread; and
determining that the first race condition is a benign race condition when the value written by the write instruction of the first instruction thread is equal to the value stored at the memory location prior to executing the write instruction.

10. The one or more computer-readable media of claim 9, further including executable code for:
generating a race condition report based on the filtering.

11. The one or more computer-readable media of claim 10, wherein the filtering is performed by recording execution of the first instruction thread and the second instruction thread in a replay log.

12. The one or more computer-readable media of claim 9, further including executable code for:
identifying an output bug associated with executing the first instruction thread; and
identifying at least one of the plurality of race conditions as a harmful race condition based on identifying the output bug.

13. The one or more computer-readable media of claim 12, wherein at least one of executing the first instruction thread or executing the second instruction thread is not associated with the output bug.

14. One or more computer-readable media comprising executable code for performing the following steps:
recording an execution of a first execution context and a second execution context, the first execution context comprising a write operation that writes to a memory at a memory address, and the second execution context comprising a read operation that reads from the memory via the same memory address that is written to by the write operation;
detecting a race condition that may occur when concurrently executing the first execution context and the second execution context;
identifying one or more bits at the memory address that are modified by the write operation;
identifying one or more bits at the memory address that are read by the read operation;
determining whether the bits read from the memory address by the read operation overlap with the bits written to the memory address by the write operation; and
when the bits read by the read operation do not overlap with the bits written by the write operation, categorizing the race condition as a benign race condition.

15. The one or more computer-readable media of claim 14, the steps further comprising generating a race report identifying the race condition as a benign race condition.

16. The one or more computer-readable media of claim 14, wherein determining whether the bits read by the read operation overlap with the bits written by the write operation comprises:
determining at least a first effective bit mask for the write operation and a second effective bit mask for the read operation,
wherein, when the first effective bit mask and the second effective bit mask intersect, the bits read by the read operation are determined to overlap with the bits written by the write operation.

17. The one or more computer-readable media of claim 16, the steps further comprising:
when the first effective bit mask and the second effective bit mask intersect, categorizing the race condition as a potentially harmful race condition.

* * * * *